June 16, 1953  J. DORAN  2,641,861

FISHING DEVICE

Filed March 18, 1947

INVENTOR
JOSEPH DORAN
BY: *Ben V. Zillman*
ATTORNEY

Patented June 16, 1953

2,641,861

UNITED STATES PATENT OFFICE 2,641,861

FISHING DEVICE

Joseph Doran, St. Louis, Mo., assignor to
Joseph J. Doran, Barrington, Ill.

Application March 18, 1947, Serial No. 735,385

2 Claims. (Cl. 43—37)

This invention relates generally to fishing devices, and more particularly to a bait-holder adapted to be used in any sort of fishing from a line, and has for its principal object to so construct the device that it will have means to more positively retain the fish that attempts to remove the bait therefrom.

An important object of this invention is to so mount one or more hooks adjacent to the bait-holders on this device, that when the fish attempts to remove the bait, these hooks will fly out and into the fish so that the latter will not escape.

Another object of the invention is to so arrange said hooks that the fish will be engaged by the same, no matter whether said fish seeks to remove the bait from either of the sides of the device or from an end thereof.

An added object of my invention is to provide in such a device a carrier or holder that will hold live bait without piercing said bait, so that the effective life of the latter is materially increased.

Many other objects and advantages of the construction herein shown and described will be obvious to those skilled in the art to which this invention appertains, as will be more clearly apparent from the disclosures herein given.

In the drawings, wherein like reference characters represent like or corresponding parts throughout the views, Figure 1 is a front view of the device, with parts at the upper end broken away in order to show the same in section;

Figure 1:
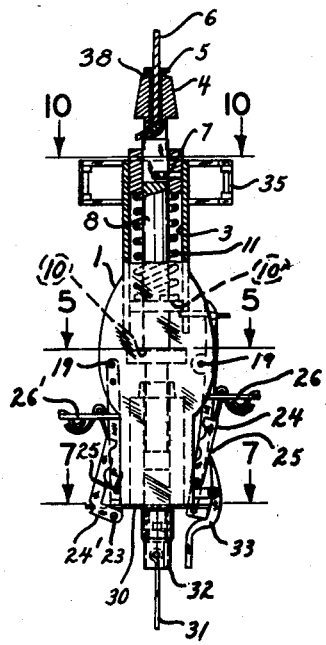

Referring more particularly to the drawings, wherein I have illustrated a preferred embodiment of my invention, there is shown a device adapted to be used by fishermen, and intended to be tied to the end of a line and to either float horizontally or vertically as desired. The device may have one or more baits or lures, so arranged that the fish attempting to remove a bait will spring one or more hooks or prongs from sheathed position to a bared or unsheathed position.

Such a device may comprise a casing or body member 1, made of a suitably sturdy and long-lasting material, as for instance of a light metal such as aluminum, and the same may be painted or otherwise ornamented as suits the taste.

Such a casing is provided with an enlarged uppermost or forward central bore 3 extending longitudinally inwardly from said forward or upper end, and with another but reduced bore 2 aligned with but spaced longitudinally below the adjacent lower end of the bore 3.

A head or tip 4 is arranged to be attached to said casing at the upper or forward end of the latter, said head having an aperture 5 therethrough, for securing one end of the line 6 thereto, so that the fisherman may cast or otherwise propel or actuate the device into the stream desired to be fished.

The lower end of the head element 4 is of a size to removably fit within the upper open end of the casing at its enlarged bore 3, and a cross pin or key 7 may be used to extend through the casing and the head to removably interlock them together.

Figure 4:
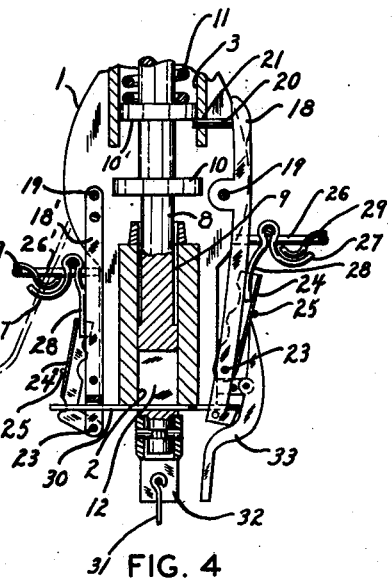
Figure 4 is an enlarged fragmentary cross-section of the lower portion of the device, with the parts in position to be tripped.
Figure 5:
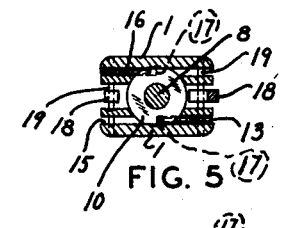
Figure 5 is a partial transverse cross-section, taken along the line 5—5 of Fig. 1, with the bait-holder omitted.
Figure 3:
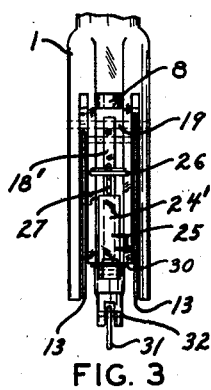
Figure 3 is a view similar to that shown in Fig. 2, of the lower end of the device and opposite to the face shown in the latter figure.
Figure 7:
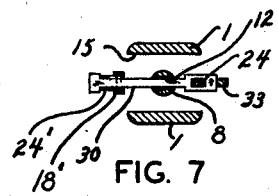
Figure 7 is a transverse cross-sectional view, taken along the line 7—7 of Fig. 1.

A plunger 8 is mounted to slidably reciprocate within the bores in the casing, said plunger having a reduced diameter portion 9 to slide within the reduced bore 2 of the casing, and provided with a pair of opposed spaced apart annular flanges or shoulders 10—10' intermediate the ends of the plunger, the uppermost flange 10' being slidably received within the bore 3 of the casing, as shown most clearly in Fig. 4. A coil spring 11 is interposed in the casing between the head element 4 and the uppermost flange 10' of the plunger to normally urge the latter downwardly or outwardly of the casing from its retracted position. It is to be noted that the plunger is provided with a longitudinally extending medial slot 12 adjacent its lower end to cooperate with another element 33 to be hereinafter described, to guide the plunger in its reciprocatory movement and prevent any rotation of the latter. In order to prevent damage to said aforementioned cooperating element when the plunger is released to its outermost position, the flange 10 lowermost on the plunger may act as a stop and strike against the upper end of the reduced bore 2 of the casing prior to the upper end of the slot 12 abutting the said cooperating guiding element above referred to.

A pair of prongs or hooks 13—13 are mounted on the casing so that they may be retracted to a sheathed position so as not to snag or enter an object near-by, but are controlled by the movement of the fish attempting to remove bait from the device, to instantaneously release the hooks to their operative or unsheathed position.

Figure 6:
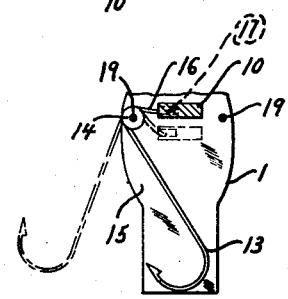
Figure 6 is a view partly in section, showing the hook that is to be released by attempted removal of bait from a bait-holder.
Figure 10:
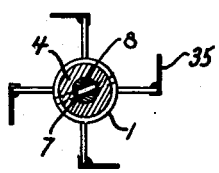
Figure 10 is a transverse sectional view, taken along the line 10—10 of Fig. 1, showing the vanes with lower portions on the casing omitted.
Figure 9:
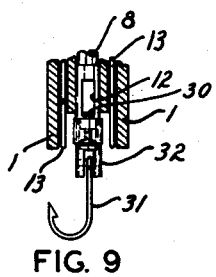
Figure 9 is a fragmentary view of the lower end of the device, with parts in section.

Each of said hooks 13 is pivotally mounted at 14 to said casing, and is arranged to be received within a longitudinal slot 15 in the latter, so that said hook may be held in its retracted position sheathed within said slot, as indicated in Fig. 6 in full lines, but when the hooks are actuated to pivot they will be moved to their operative or unsheathed position as indicated in dotted lines. The upper end of each hook carries a lug 16 to act as an actuating lever arm to interlock with a recess or abutment 17 on the plunger 8, so that as the plunger shifts to its end positions, the hooks will be correspondingly shifted simultaneously therewith to their end positions.

Figure 2:
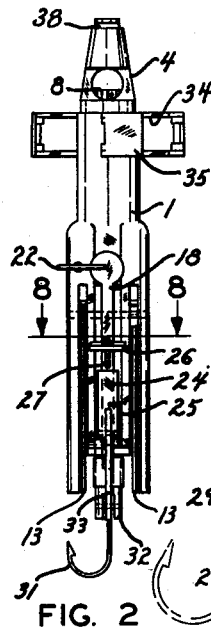
Figure 2 is a view in side elevation, taken substantially at right angles to the showing in Fig. 1.
Figure 8:
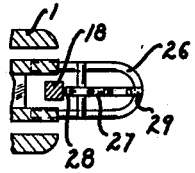
Figure 8 is a partial transverse section, taken along the line 8—8 of Fig. 2.

A pair of bar elements 18—18' are each pivotally mounted at 19 on the casing, one on each side of the latter, one of said bars being mounted intermediate its ends and provided adjacent its upper end with a cross pin 20 movable through an opening 21 in the casing to releasably latch beneath the upmost collar or flange 10 of the plunger, as shown most clearly in Fig. 4, to thereby hold said plunger in its retracted position while so interlocked, and thus holding the cooperating hooks 13—13 retracted. However, as soon as the pin 20 is withdrawn from locking engagement with the plunger, the latter will be projected to its outermost position, thereby actuating said pair of side hooks to their outwardly projecting operative or unsheathed position. In order to hold the hooks retracted, and render them safe for carrying the device when not in use, a cam or clamp element 22 may be mounted to over-ride the latch bar having the cross pin, as shown most clearly in Figs. 1 and 2.

On each latch bar 18—18' there is pivotally mounted bait-holders 24—24' respectively at 23, these bait-holders being resiliently urged against said bars by springs 25 or the like. Although the worm or other bait could be clipped between either of said bait-holders and its associated latch bar to thereby maintain the bait in place during the fishing operation, I prefer to use auxiliary means to hold said bait with a minimum of injury to the bait. This is important when using live bait, for an uninjured bait will last correspondingly longer than an injured one.

For that purpose I have arranged side brackets 26—26' projecting laterally from the casing, one of them adjacent each of the holders 24 and 24' respectively, and to each of these brackets I pivot the auxiliary bait-holder element having the pair of angularly arranged arms 27—28 formed of a length of relatively narrow wire band, one of the arms opposed to the bracket on which it is mounted, and the other arm movably interlocking with the cooperating holder and also bearing against the bar 18 or 18', all shown most clearly in Fig. 4.

A light spring 29 may be interposed between the arm 27 and the opposed face of the bracket on which the latter is mounted. It is therefore possible to hold a worm with its intermediate portion lightly gripped between one of said auxiliary elements 24 and 24' and the cooperating latch bar, and bringing the head and tail of the worm into overlapped relation and lightly gripped between the spring 29 and its cooperating bracket 26 or 26'.

A cross bar 30 extends transversely across the bottom of the casing and through the medial slot 12 in the plunger, to assist in preventing rotation of the latter, the ends of said bar being pivotally attached to the pair of elements 24—24', so that the pair of latch bars will operate in unison when either one is actuated.

A third hook 31 may be carried at the lowermost end of the plunger, as by pivoting the hook thereon to a sleeve 32 swivelled to said plunger.

A trip element 33 may be pivoted intermediate its ends to the lower end of the casing, one arm of said element or lever depending to a point very closely adjacent the hook 31, and the other lever arm of the element bearing on an element 24 or 24' controlling the cooperating latch bar, as seen in Fig. 4.

Now, when a fish attempts to strike the hook 31 or the bait thereon, it will also strike the control element 33, to pivot the bar 18 or 18' and shift the pin 20 from its locking engagement, thereby permitting the plunger to release and shoot downwardly and simultaneously throwing the side hooks into unsheathed position. In reality, the entire device is only about two inches in length, the drawings being over-size in order to show the invention more clearly, and the distance between the trailing or lowermost hook and the pair of side hooks is approximately an inch, so that this size makes it possible that when the fish is attempting to swallow the bait on the lower hook, the side hooks will be released and will snag into the jaws of the said fish. Similarly, the side baits are held sufficiently close to the side hooks so that the fish will release the latter and be snagged thereby in like manner.

In order to make the device more alluring to the fish I give a predetermined movement to the same by causing the stream to flow against the device in such a manner as to rotate or spin the same. Openings 34 are arranged at substantially equidistant intervals about the head end of the device, and vanes or baffles 35 are vertically hinged to one of the bounding edges of said openings, said vanes being movable through a limited arc, so that the moving stream will thereby cause a spinning or slow rotation of the vertically suspended device.

What I claim as new and desire to secure by Letters Patent is:

1. In a device of the kind described and in combination, a casing adapted to be connected at one end to a fishing line, a laterally projectable hook pivotally mounted on said casing and normally held entirely sheathed within the confines of said casing, a transversely extending bait-holder mounted on said casing intermediate the ends of said casing, and means on said casing closely adjacent said bait-holder and said hook and fish-actuated to release and unsheath said hook through movement of said fish in its attempted removal of said bait that is held in said holder.

2. In a fish lure, a casing adapted to be carried at the end of a line, a hook pivotally connected to said casing, a plunger in said casing and operably connected to said hook so that the latter is normally held sheathed within said casing and is releasably movable to unsheathed position to project laterally beyond said casing, a bait-holder movably mounted on said casing, a bar operably movable to engage said plunger to releasably lock the latter so that said hook is held sheathed, and a trip element mounted adjacent said bait-holder and operable by movement of said bait-holder to release said hook when said bait-holder is actuated by a fish.

JOSEPH DORAN.

References Cited in the file of this patent

UNITED STATES PATENTS

| Number | Name | Date |
|---|---|---|
| 616,209 | Stanek | Dec. 20, 1898 |
| 810,822 | Tinkess | Jan. 23, 1906 |
| 1,172,780 | Ferree | Feb. 22, 1916 |
| 1,854,024 | Farley | Apr. 12, 1932 |
| 2,010,641 | Nyvall | Aug. 6, 1935 |
| 2,079,335 | Pflueger | May 4, 1937 |
| 2,079,883 | Valasek | May 11, 1937 |
| 2,095,425 | Tveter | Oct. 12, 1937 |
| 2,200,670 | Hargrett | May 14, 1940 |
| 2,229,259 | Sherwood | Jan. 21, 1941 |
| 2,437,803 | Bell | Mar. 16, 1948 |
| 2,445,461 | St. John | July 20, 1948 |